United States Patent [19]

Remion

[11] Patent Number: 5,012,589
[45] Date of Patent: May 7, 1991

[54] DISPLACEMENT SERVO GAUGE

[75] Inventor: Michel Remion, Costa Mesa, Calif.

[73] Assignee: Magnetrol International, Downers Grove, Ill.

[21] Appl. No.: 367,026

[22] Filed: Jun. 16, 1989

[51] Int. Cl.⁵ .................... G01F 23/36; G01N 9/08
[52] U.S. Cl. .................... 33/720; 33/715; 33/719; 318/482; 73/313; 73/447
[58] Field of Search ............... 33/713, 714, 715, 716, 33/719, 720, 721; 73/308, 313, 321, 437, 451, 452, 453, 454, 447; 364/558; 318/642, 482

[56] References Cited

U.S. PATENT DOCUMENTS

| | | |
|---|---|---|
| 2,567,823 | 9/1951 | Needham . |
| 2,758,474 | 8/1956 | McKinney ............... 73/313 |
| 3,401,563 | 9/1968 | Lonnon . |
| 3,500,546 | 3/1970 | Pilcher ................... 33/715 |
| 3,713,224 | 1/1973 | Bengoa ................... 33/715 |
| 3,821,901 | 7/1974 | Fann ...................... 73/451 |
| 4,052,612 | 10/1977 | Larkin ................... 33/716 |
| 4,181,960 | 1/1980 | Tateishi et al. . |
| 4,236,314 | 12/1980 | Schmidt et al. ........... 33/715 |
| 4,244,219 | 1/1981 | Takahashi ................ 73/321 |
| 4,356,557 | 10/1982 | Bell et al. . |
| 4,527,107 | 7/1985 | van der Pol et al. ........ 73/321 |
| 4,565,007 | 1/1986 | Issenmann . |
| 4,635,478 | 1/1987 | Hope ..................... 33/720 |
| 4,786,846 | 11/1988 | Uchida ................... 73/313 |

FOREIGN PATENT DOCUMENTS 8901618 2/1989 World Int. Prop. O. ........... 73/437

Primary Examiner—William A. Cuclinski, Jr.
Assistant Examiner—Alvin Wirthlin
Attorney, Agent, or Firm—Wood, Phillips, Mason, Recktenwald & VanSanten

[57] ABSTRACT

A level gauge is used on a tank containing a liquid. The gauge utilizes a displacer suspended on a support wire or tape which is wound on a storage wheel. The storage wheel is balanced by a counterweight. Any change in liquid level results in an imbalance which causes a servo motor to energize and rotate the wheel to bring the counterweight and displacer back into balance. The change in level is determined by counting the steps of motor operation. The changes in level are determined using the relationship between length and steps of motor operation. The level gauge is operable to continually correct calculation to compensate for changes in wire length per turn of the spool.

16 Claims, 9 Drawing Sheets

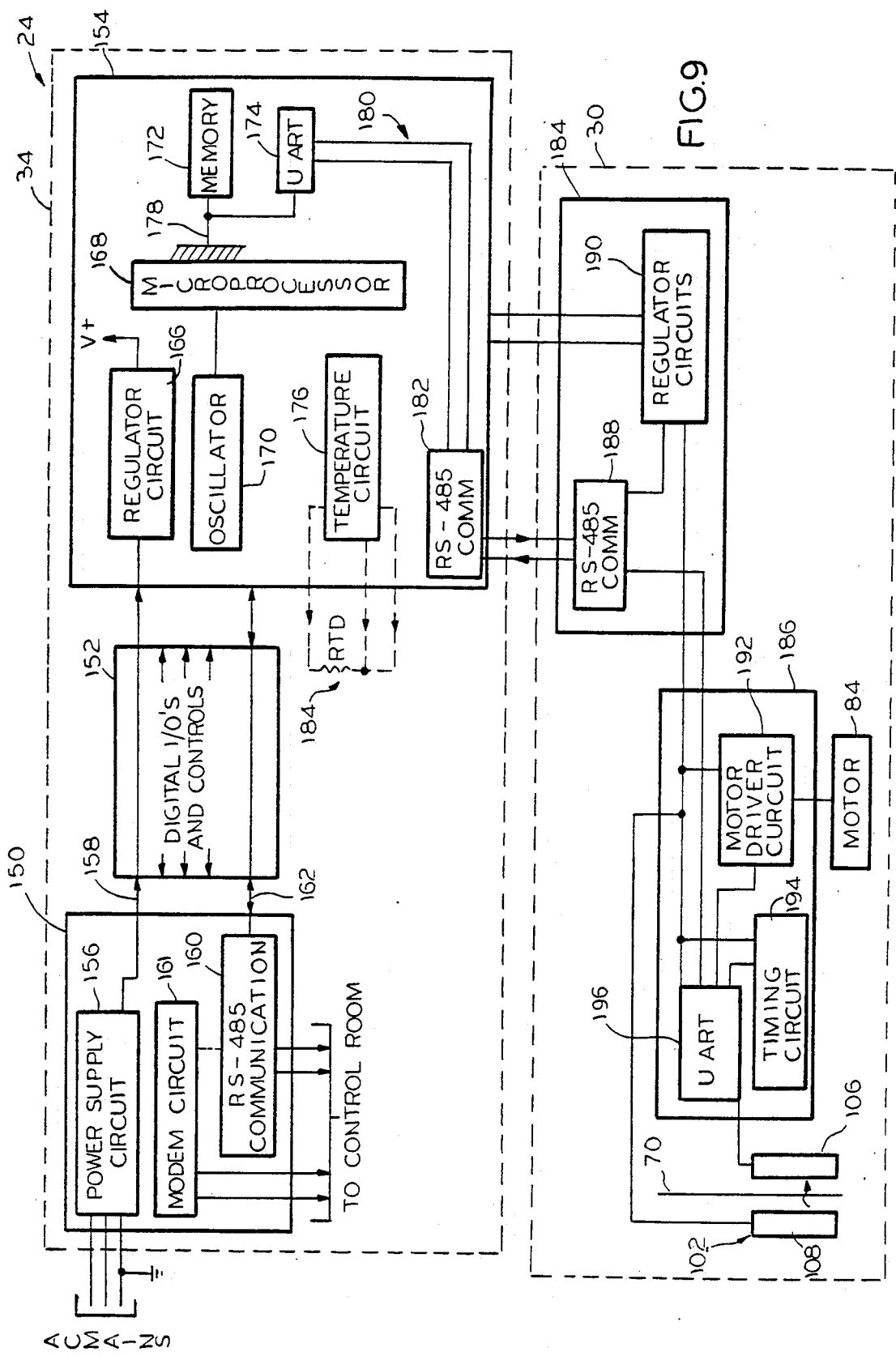

DISPLACEMENT SERVO GAUGE

FIELD OF THE INVENTION

This invention relates to a process instrument and, more particularly, to a displacement servo gauge.

BACKGROUND OF THE INVENTION

Numerous types of process instruments are available for measuring level, such as level in a tank. One such instrument is a displacement servo gauge. A servo gauge uses a counterweight or spring to balance the weight of a displacer. The displacer is suspended on a cable from a drum. The drum is coupled to the spring or counterweight. The spring or counterweight is selected so that an equilibrium condition exists when the displacer is at the top surface of the liquid. A change in the liquid level causes a corresponding change in the counterforce to move the gauge out of balance. Upon sensing such an imbalanced condition, a servo motor rotates the drum to raise or lower the displacer, as is necessary, until the gauge is again in balance. Rotational movement of the motor, which represents movement of the drum and thus the cable and displacer, is sensed to calculate the change in level.

Problems have been found associated with prior displacement servo gauges. Particularly, errors in level measurement can occur due to variations in drum diameter, as well as weight of the cable. Specifically, if the cable is wound in multilayers on the drum, then the exact length of cable relating to an increment of rotational movement of the servo motor shaft continually changes. This is due to the difference in circumferential length of the outer layers versus the inner layers when wound on the drum. Further, in the equilibrium state, the applied forces are balanced when the sum of the weight of the cable and the weight of the displacer is equal to the buoyancy force exerted by the liquid and the counterforce of the gauge. The weight of the displacer is a constant. In conventional gauges the counterforce weight is also constant. However, the weight of the tape varies with its extended length, which in turn varies with the liquid level. Thus, with conventional gauges, any change in weight of the tape requires a variation in the buoyancy by changing the penetration of the displacer and the liquid. This change results in an error in the reading of the level of the fluid, reflecting this change of penetration.

In certain applications, knowing the specific gravity of the liquid is important. In fact, the specific gravity has an effect on the operation of the gauge. Therefore, it is desirable to quickly and easily measure the specific gravity of a liquid, the level of which is being sensed.

Conventional servo gauges measure a variation of torque in the drive gear train between the servo motor and the drum. An alternative approach is described in Schmidt et al. U.S. Pat. No. 4,236,314 which discloses the motor pivotally suspended from a shaft of the cable spool. Therefore, the motor itself acts as a counterweight. A switch is positioned within the range of pivotal movement of the motor and is actuated when a displacer impinges on the surface of the liquid. With such a construction, the position of the switch is important relative to the particular liquid being sensed. Specifically, changes in specific gravity of the liquid require changes in positioning of the switch due to a corresponding change in the buoyancy force. Moreover, such a construction, as well as the conventional construction, permits sensing of only a single type of liquid.

Frequent calibration of level gauges has proven to be both costly and difficult. Normally, a maintenance person must go out to the site of the instrument to manually measure the liquid and calibrate the gauge. Where the gauge is mounted at the top of the tank, this proves quite cumbersome.

The present invention is directed to solving one or more of the problems discussed above.

SUMMARY OF THE INVENTION

It is object of the invention to provide a self compensating servo gauge which accurately senses level in a tank.

In accordance with this invention, a level gauge is used on a tank containing a liquid. The gauges utilizes a displacer suspended on a support wire or tape which is wound on a storage wheel. The storage wheel is balanced by a counterweight. Any change in liquid level results in an imbalance which causes a motor to energize and rotate the wheel to bring the counterweight and displacer back into balance. The change in level is determined by counting the steps of motor shaft rotation. Each step corresponds to a corresponding incremental linear movement of the displacer. Specifically, the level gauge according to the invention is operable to continually update the incremental amount to compensate for changes in wire length per turn of the storage wheel.

According to another aspect of the invention, the motor is mounted so that it forms part of a scale assembly which represents the counterweight. A detector operates by measuring movement of the scale assembly. In fact, the scale assembly operates as a lever. The position of the lever is sensed using a coding strip and sensors to determine if the system is in balance.

It is a feature of the invention that the coding strip includes multiple sensing points for sensing a plurality of different balance positions. Each balance position is related to a characteristic of the liquid in the tank.

According to a further aspect of the invention, the gauge is operable to compensate for weight of the extended length of the tape. Specifically, the total weight of the force to be balanced varies according to the length of the tape which is unwound. To compensate for such changes in length, and in order to avoid errors in measurement, the control is operable to change the ratio between moment arms for the displacer and the counterforce.

It is a feature of this aspect of the invention that the moment arm for the counterforce is fixed relative to an axis of the wheel shaft. The moment arm for the displacer varies according to the number of turns of the tape wound on the wheel, which can be readily calculated. The ratio between the weight of the tape per unit length and the diameter of the storage wheel can thus be selected to provide full compensation and suppress any error of measurement.

It is yet another aspect of the invention to provide a servo gauge which is operable to determine specific gravity of the liquid in the tank. Such determination is made by immersing the displacer in the liquid, sensing the difference in archemedy force when the displacer is out of the liquid and calculating the specific gravity therefrom.

According to yet a further aspect of the invention, a self-calibrating servo gauge is provided. In order to calibrate the instrument, the gauge moves the displacer between the top of the tank and the bottom of the tank to determine total height of the tank. The displacer is then moved to the top surface of the liquid. The gauge is recalibrated by determining the amount of movement required to return the displacer to the top surface, relative to the overall tank height.

Further features and advantage will readily be apparent from the specification and from the drawings.

BRIEF DESCRIPTION OF THE DRAWINGS

FIG. 9 is a block diagram representation of an electrical circuit for the gauge.

DESCRIPTION OF THE INVENTION

The embodiment of the invention illustrated in the enclosed drawings and specification is an instrument responsive to the level in a process tank or vessel.

Figure 1:
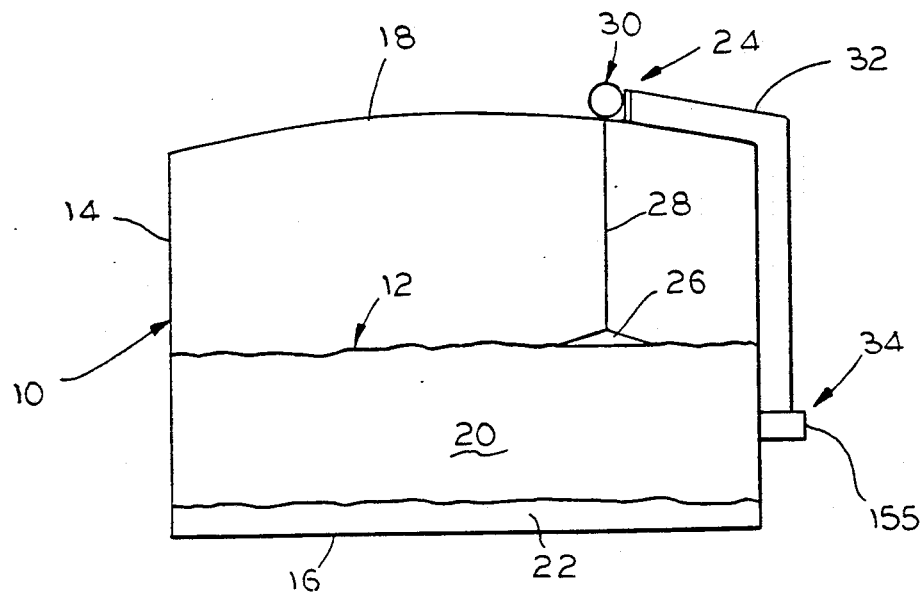
FIG. 1 is an elevation illustrating a typical installation using the gauge.

Referring first to FIG. 1, a process vessel or tank 10 contains a substance 12, the level of which is to be measured. The tank 10 has a peripheral side wall 14 connected between a bottom wall 16 and a top wall 18. The substance 12 may comprise two liquids, such as an oil or other substance 20 and a higher density substance, such as water 22, below the oil 20.

A process instrument comprising a displacement servo gauge 24 is used to sense level of the substance 12 in the tank 10. The gauge 24 includes a displacer 26 suspended by a wire tape 28 from a gauge head 30. The gauge head 30 is connected via suitable conductors carried in a conduit 32 to a tank side control unit 34.

Figure 2:
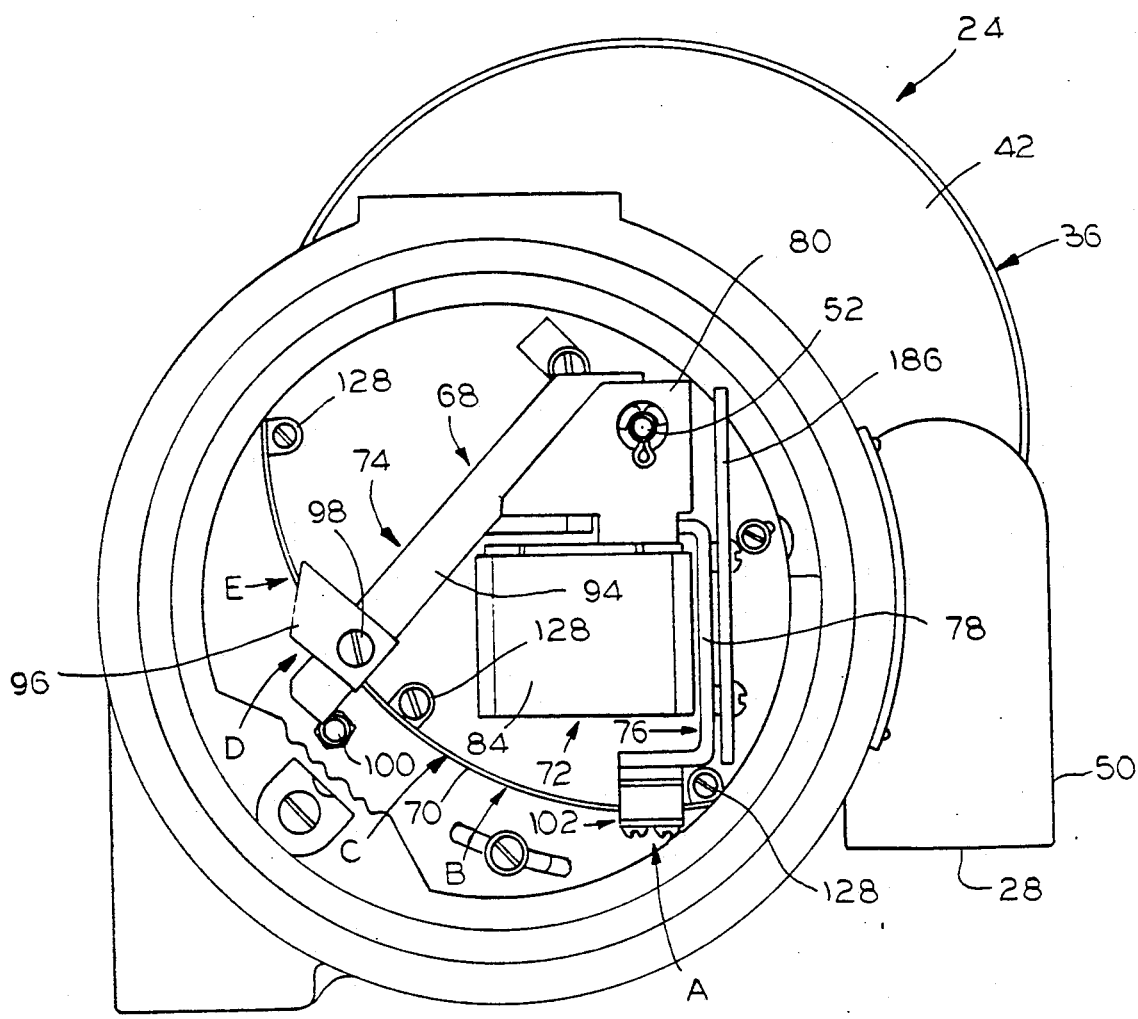
FIG. 2 is a side view of the gauge head with the cover removed.
Figure 3:
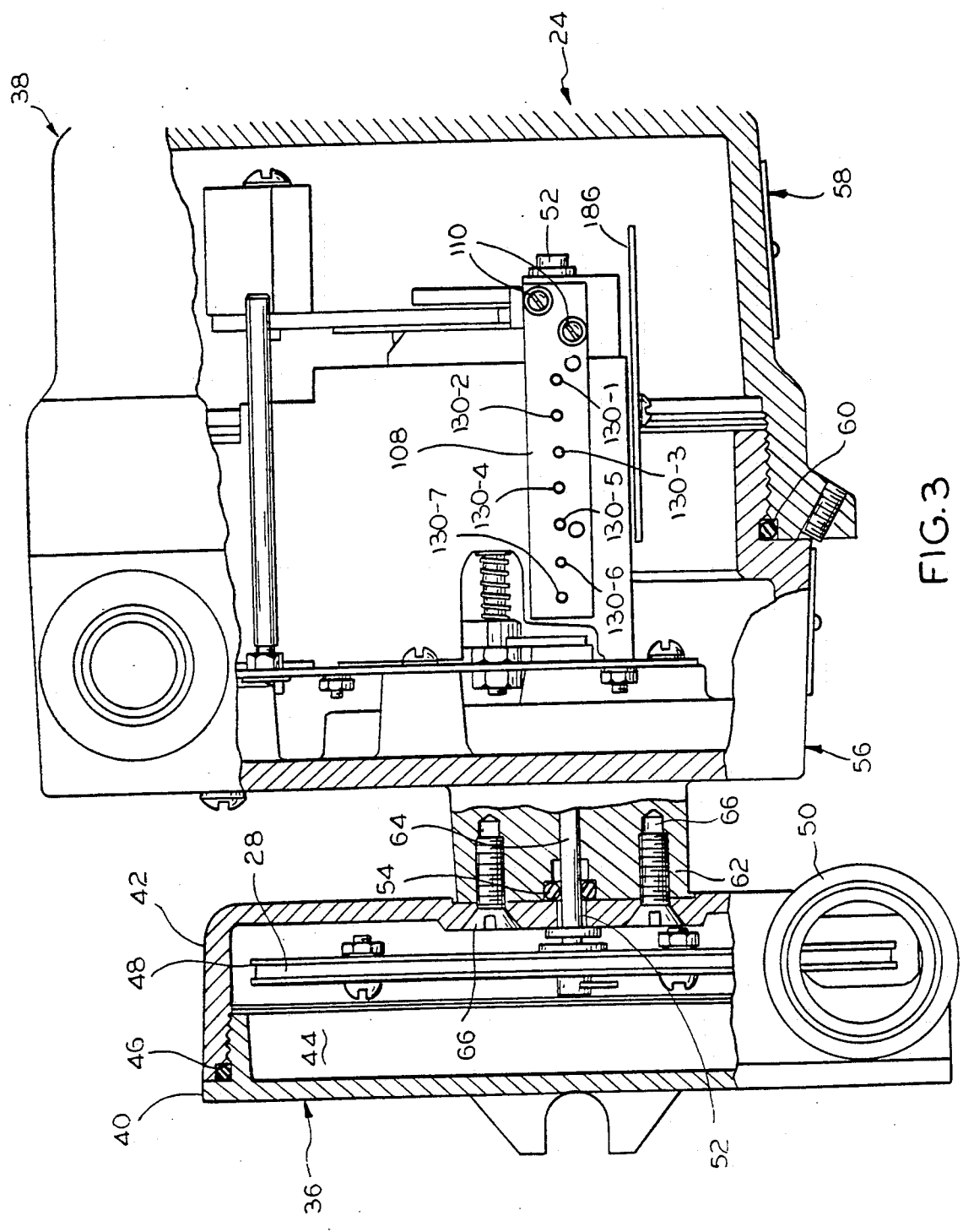
FIG. 3 is a bottom plan view of the gauge head with parts removed for clarity.

With reference to FIGS. 2 and 3, the gauge head 24 is illustrated in greater detail. The gauge head 24 includes a tape housing 36 and a beam assembly housing 38. The tape housing 36 is of two piece construction comprising a base 40 threadably received into a cover 42 to define an interior space 44. An O-ring 46 provides a seal between the base 40 and the cover 42. Housed in the space 44 is a tape wheel or spool 48 upon which is wound the wire tape 28. The cover 42 includes an outer tangential and downwardly opening sleeve 50 through which the tape 28 exits the tape housing 36.

The spool 48 is rotational with a shaft 52 which passes through a cover opening 54 into the beam assembly housing 38.

The beam assembly housing 38 is also of two piece construction and includes a base 56 threadably connected to a cover 58. An O-ring 60 provides a water tight seal therebetween. The base 56 includes a neck 62 having a central opening 64. The neck 62 is connected to the tape housing cover 42 utilizing suitable fasteners 66.

Figure 5:
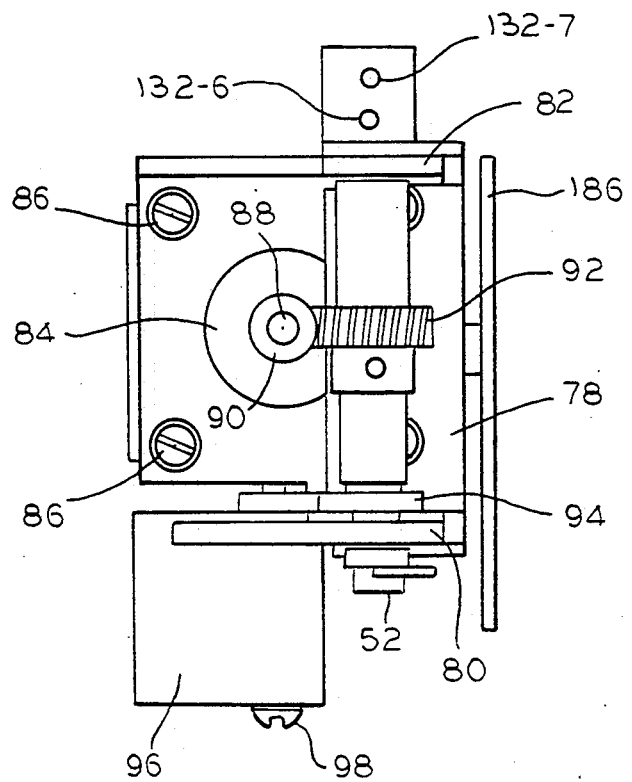
FIG. 5 is a top view of the beam assembly taken along the line 5—5 of FIG. 4.

The beam assembly housing 38 houses a beam assembly 68 and a coding strip 70. The beam assembly 68 is pivotally mounted to the shaft 52 and includes first and second counterweight assemblies 72 and 74, respectively. Referring also to FIG. 5, the first counterweight assembly 72 comprises a support 76 including a J-shaped bracket 78 connected to opposite upwardly extending side walls 80 and 82. Each side wall 80 and 82 includes an opening which receives the shaft 52. Thus, the support 76 is loosely received and is pivotal on the shaft 52.

A servo or stepper motor 84 is secured to the J-shaped bracket 78 using fasteners 86 and includes a motor shaft 88 extending upwardly through an opening in the bracket 78. A toothed wheel 90 is rotatable with the motor shaft 88 and meshes with a screw thread 92 coupled to and rotatable with the spool shaft 52.

The second counterweight assembly 74 comprises a beam 94 having an opening through which the shaft 52 loosely passes. Specifically, the beam 94 is mounted on the shaft between the support side walls 80 and 82, as seen in FIG. 5. A weight 96 is connected to the beam 94 using a fastener 98.

Figure 4:
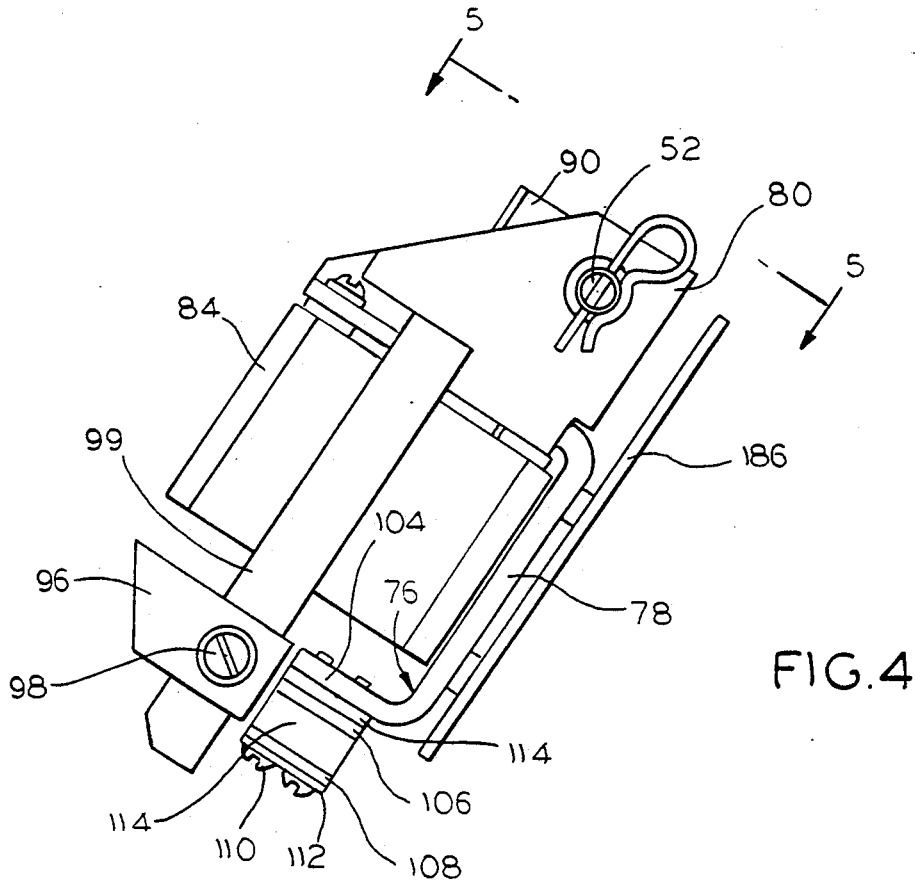
FIG. 4 is a side view, similar to that of FIG. 2, specifically illustrating the beam assembly in a select balance condition.

With specific reference to FIG. 2, if there is no effective counterweight suspended on the wire tape 28, then the first counterweight assembly 72 extends directly downwardly. However, the second counterweight 74 is retained in approximately a forty-five degree position. Particularly, the beam 94 abuts a stop member 100 which prevents further downward pivotal movement of the second counterweight assembly 74. As the net counterweight on the wire tape 28 is increased, the first counterweight assembly 72 pivots in a clockwise direction. Once the first counterweight assembly 72 reaches the forty-five degree position, then the second counterweight beam 94 abuts the first counterweight support 76 so that the first counterweight assembly 72 carries the second counterweight assembly 74. Specifically, in application, the second counterweight assembly 74 is normally used only when the displacer 26 is suspended in air above the substance 12. Thus the second counterweight assembly 74 operates to replace the buoyancy force of the substance 12 which is eliminated when the displacer 26 is suspended in air. The engagement between the first and second counterweight assemblies 72 and 74 is specifically illustrated in FIG. 4.

The use of two separate counterweights, as shown, results in an overall smaller unit.

Figure 6:
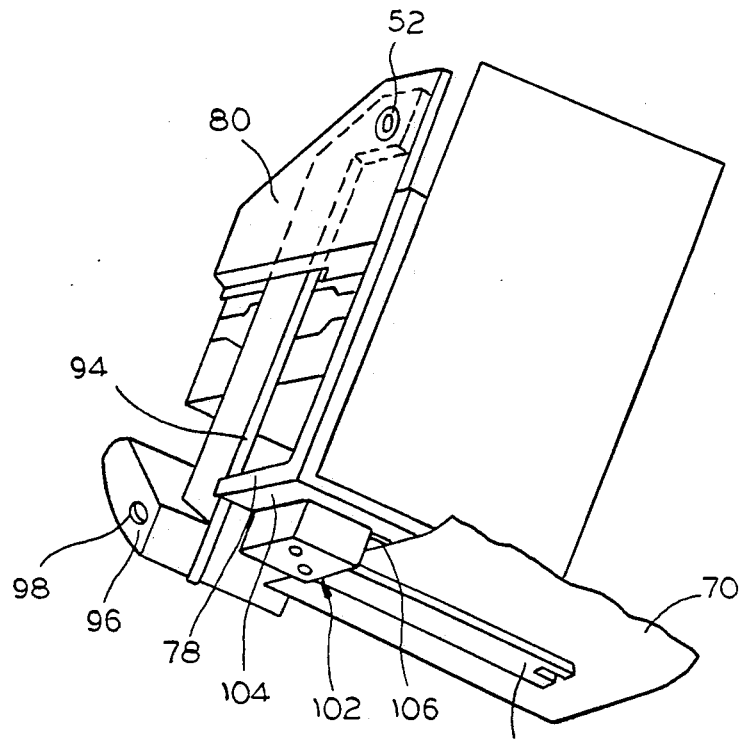
FIG. 6 is perspective view of the beam assembly and coding strip.

Referring also to FIG. 6, an encoder assembly 102 is connected to a bottom wall 104 of the J-shaped bracket 78. The encoder assembly 102 includes a phototransistor board 106 parallel to and spaced from an LED board 108. Specifically, a pair of screws 110 pass through a plate 112 to the LED board 108, through a spacer plate 114, the phototransistor board 106 and an insulation plate 114 to the wall 104. The coding strip 70 is disposed between the phototransistor board 106 and the LED board 108.

Figure 7:
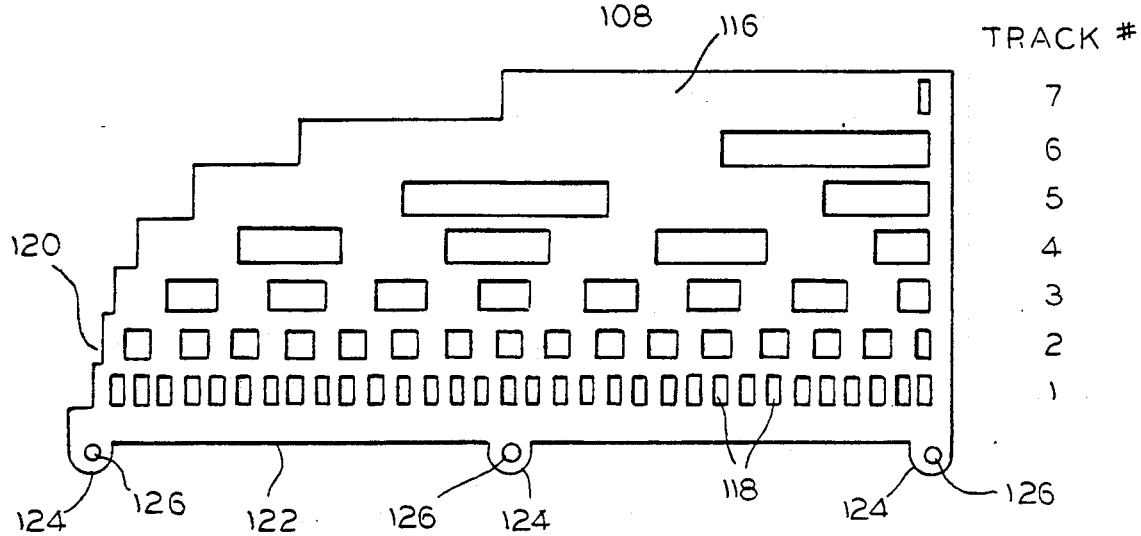
FIG. 7 is a plan view of the coding strip.
Figure 8:
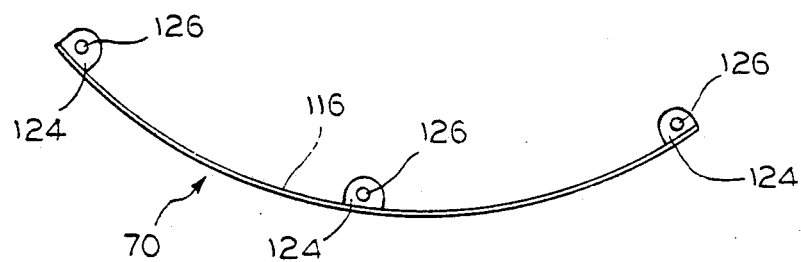
FIG. 8 is a side view of the coding strip.

With reference to FIGS. 7 and 8, the coding strip 70 is illustrated. The coding strip 70 may be formed of any flat pliable material which is elongated and of generally rectangular shape. The coding strip 70 comprises a plate 116 having a plurality of spaced apart rows of apertures 118. The rows are labelled as Track #1, Track #2 Track #7. Within each row, the number, the length of and the spacing between apertures 118 is selected relative to the others to provide a binary representation indicating the longitudinal position relative to a reference line 120.

Longitudinally spaced and laterally extending from a side edge 122 of the plate 116 are a plurality of tabs 124 each including an aperture 126 therethrough. Specifically, the coding strip 70 is mounted in the beam assembly housing 38 by folding up the tabs 124 and flexing the plate 116, as is illustrated in FIG. 8. Fasteners 128 extend through the apertures 126 into suitable openings in the base 56.

The encoder assembly 102 includes an LED and phototransistor pair for each track on the coding strip 70. Specifically, the LED board 108 includes seven LEDs, labelled 130-1 through 130-7, see FIG. 3. Opposite each LED 130 is a phototransistor, generally labelled as 132, see for example 132-6 and 132-7 in FIG. 5.

The encoder assembly 102 is operable in connection with the coding strip 70 to sense the pivotal position of the first counterweight assembly 70 relative to the shaft 52. Each of the LEDs 130 is continually illuminated. The position of the first counterweight assembly 72, and thus the encoder assembly 102, determines which phototransistors 132 receive illumination, and thus are energized. As is apparent, a given phototransistor 132-x is energized only if a coding strip aperture 118 is disposed between the particular phototransistor 132-x and its associated LED 130-x, where x represents one of the pairs 1-7. Conversely, if no coding strip aperture 118 is between a given LED 130-x and phototransistor 132-x, then the phototransistor 132-x will not be energized.

Thus, the encoder assembly 102 and coding strip 70 can be used to sense a plurality of pivotal positions of the beam assembly 68, specifically the first counterweight assembly 72.

As is well known, the buoyancy force generated on the displacer 26 by any substance 12 depends on the specific gravity of the particular substance. Therefore the counterforce required by the gauge head 30 to maintain an equilibrium condition varies with the specific gravity. Since the encoder assembly 102 can sense plural positions, representing plural displacement conditions, the gauge head 24 can be used to sense level of virtually any liquid in the tank, and in fact can be used to sense level of different liquids which are separated in the same tank.

In fact, with a known displacer 26, specific longitudinal positions on the coding strip can be empirically determined to represent the buoyancy force provided by specific substances.

For example, five separate beam assembly positions are labelled A, B, C, D and E in FIG. 2. The position labelled A represents the condition where there is no net counterweight on the tape 28, such as when the displacer 26 is removed from the tape 28 or is resting on the tank bottom wall 16. The next position, labelled B, represents a relative position for the displacer 26 at the top surface of or partially immersed in a relatively high density liquid, such as is represented by the substance 22 in the tank 10, see FIG. 1. The next position, labelled C, represents a relative position for the displacer 26 at the top surface of or partially immersed in a relatively low density substance, such as is represented by the substance 20, see FIG. 1. The next position, labelled D, represents the condition when the displacer 26 is suspended in air above the substance 12, but below the top of the top wall 18. This position is particularly shown in FIG. 4 as the position when the first counterweight assembly 72 abuts the second counterweight assembly 74. Finally, the last position, labelled E, represents the pivotal position of the encoder assembly 102 when the displacer 26 is abutting the tank top wall 18.

With reference to FIG. 9, a block diagram illustration represents a circuit for the displacement servo gauge 24. The tank side unit 34 includes a power supply printed circuit, or PC, board 150, a coupling PC board 152, and a CPU PC board 154. The PC boards are all housed in an enclosure 155, see FIG. 1, which can be mounted to the tank side wall 114, or elsewhere, in close proximity to the tank 10.

The power supply PC board 150 includes a power supply circuit 156 which receives AC power from any conventional power source. The power supply circuit 156 converts the AC power to DC power on a line 158 which is used to power the servo gauge 24. An RS-485 communication circuit 160 receives serial format data on a line 162, from the CPU board 154 via the coupling board 152, for transmission to a control room. Specifically, the control room may include a main host processor which is operable to receive information from the servo gauge 24, and also to transmit commands to the servo gauge 24, as discussed below. Alternatively, a portable hand held unit may be connected to the RS-485 communication circuit 160.

Additionally, a modem circuit 164 may be connected to the RS-485 communication circuit 160 for transmitting similar information over phone lines, as is well known.

The coupling PC board 152 is used solely for the purpose of providing direct connections between the power supply board 150 and the CPU board 154.

The CPU board 154 includes a regulator circuit 166 which receives DC power from the power supply circuit 156 and develops regulated DC output power. The main component on the CPU board 154 is a microprocessor 168. The microprocessor 168 is connected to an oscillator 170, a memory circuit 172, a UART 174, and a temperature circuit 176. The oscillator 170 provides a clocking signal for controlling operation of the microprocessor 168. The microprocessor 168 is connected to the memory 172 and the UART 174 via a bus 178. The bus 178 represents both an address bus and a data bus, as is conventional. The memory circuit 172 includes suitable RAM and ROM memory chips for storing both data and a program for operating the servo gauge 24.

The UART 174 comprises a universal asynchronous receiver transmitter, such as a Motorola 14461 chip, which is operable to convert parallel data from the bus 178 to serial data on communication lines 180 to an RS-485 communication circuit 182, and vice versa.

The temperature circuit 176 is connected to a temperature bulb 184 comprising an RTD type sensor for sensing temperature in the tank 10. The sensed temperature is used for compensation purposes, as discussed below.

The gauge head 30 includes an encoder PC board 184 and a beam assembly PC board 186. The encoder PC board includes an RS-485 communication circuit 188 which communicates directly with the CPU PC board RS-485 communication circuit 182. A regulator circuit 190 receives power from the CPU board regulator circuit 166.

The beam assembly PC board 186 is mounted to the beam assembly support 76, see FIG. 2, and includes a motor drive circuit 192, a timing circuit 194 and a UART 196. Each of these circuits is connected to the regulator circuit 190 and is powered thereby. The regulator circuit 190 is also connected to the LED board 108, discussed above, for continuously energizing each LED 130 thereon. The phototransistor board 106 is connected to the UART 196. The UART 196 receives a seven bit data signal from the phototransistor board 106 representing the position of the encoder assembly 102 relative to the coding strip 70. The UART 196 converts the parallel signal to a serial signal which is transferred to the encoder PC board RS-485 communication circuit 188 to be transferred to the microprocessor 168. The timing circuit 194 is also connected to the UART 196 and provides a suitable delay for controlling the timing of communication from the UART 196 to the RS-485 communication circuit 188.

The UART 196 is also connected to the motor driver circuit 192, which is in turn connected to the stepping motor 84. The UART 196 receives a serial format motor drive command signal originated in the microprocessor 168 and converts such signal to a parallel signal which is transferred to the motor driver circuit 192. The motor driver circuit 192 operates the stepping motor 84 to control stepwise movement, as discussed above. Particularly, energization of the stepping motor 84 results in a select incremental rotational movement of the motor shaft 88, see FIG. 5, resulting in a related linear movement of the displacer 26. The actual linear movement of the displacer 26 depends on the apparent radius of the wheel 48.

With reference to FIGS. 10a-10d, a series of flow charts represent operation of a software control program implemented by the microprocessor 168 of FIG. 9.

Figure 10A:
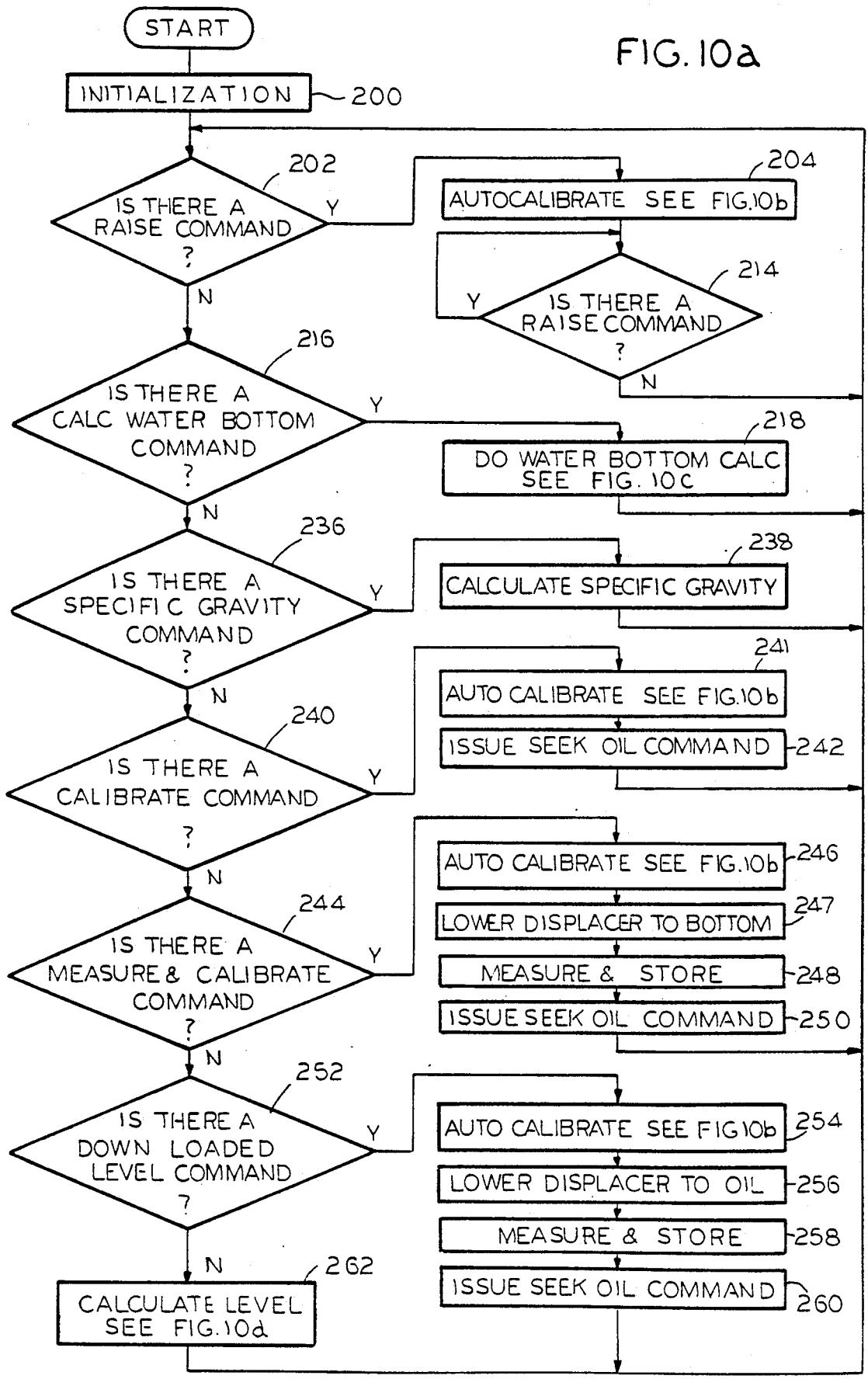
FIGS. 10a-10d comprise flow charts which illustrate operation of program in the microprocessor of FIG. 9.

FIG. 10a comprises a flow chart representing operation of a main loop of the control program. Control begins at an initialization block 200 which initializes various parameters for gauge operation. Control then advances to a decision block 202 which determines if a raise command has been received. Specifically, the raise command is one of the commands that can be received by the power supply board RS-485 communication circuit 160 from the control room host processor. If a raise command has been received, then control advances to an auto calibrate routine at a block 204. The auto calibrate routine is illustrated by the flow chart of FIG. 10b.

Figure 10B:
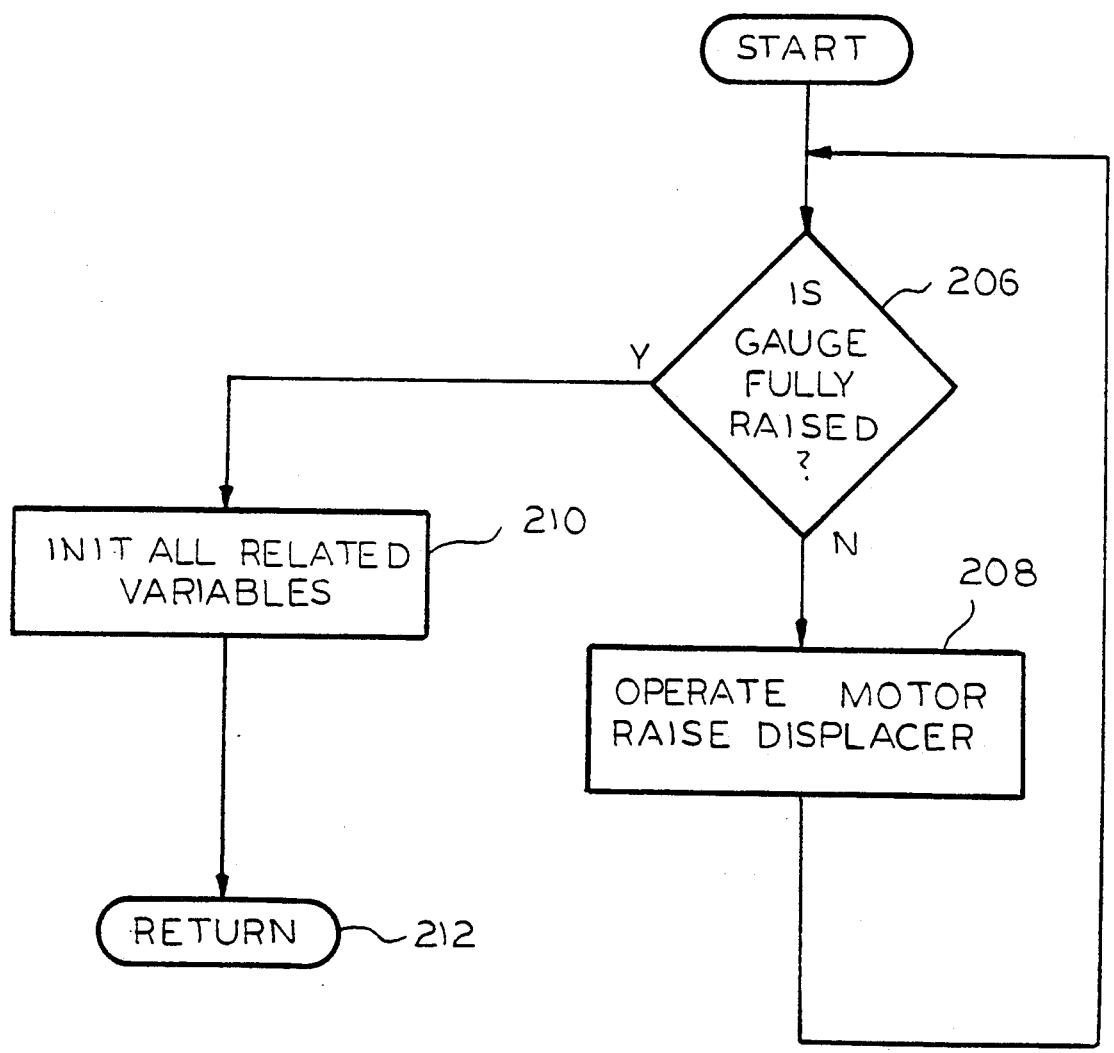

With reference to FIG. 10b, the auto calibrate routine begins at decision block 206 which determines if the displacer 26 is fully raised. Specifically, the decision block 206 determines if the displacer 26 has reached the tank top wall 18, see FIG. 1, as by the encoder assembly 102 being at the position labelled E, see FIG. 2. If not, then at a block 208 the motor 84 is energized to incrementally move the displacer 26 upwardly. Control then returns to the decision block 206 and continues to loop until it is determined at the decision block 206 that the displacer 26 is fully raised. Thereafter, control advances to a block 210 which initiates all related variables to indicate that the displacer is at the top of the tank, and at a block 212 control returns to the main loop, see FIG. 10a.

Thereafter, and referring again to FIG. 10a, a decision block 214 determines if there is still a raise command. If so, then control loops on the block 214 until the raise command is removed, at which time control returns to the decision block 202.

If there is not a raise command, as determined at the decision block 202, then a decision block 216 determines if there is a calculate water bottom command. Normally, the displacer is used to sense level of the substance 12 relative to the bottom wall 16. However, if the tank 10 contains both oil and water, for example, then it may be necessary to determine the level of the water so that the volume of oil can be accurately determined. This is done using the calculate water bottom command.

Figure 10C:
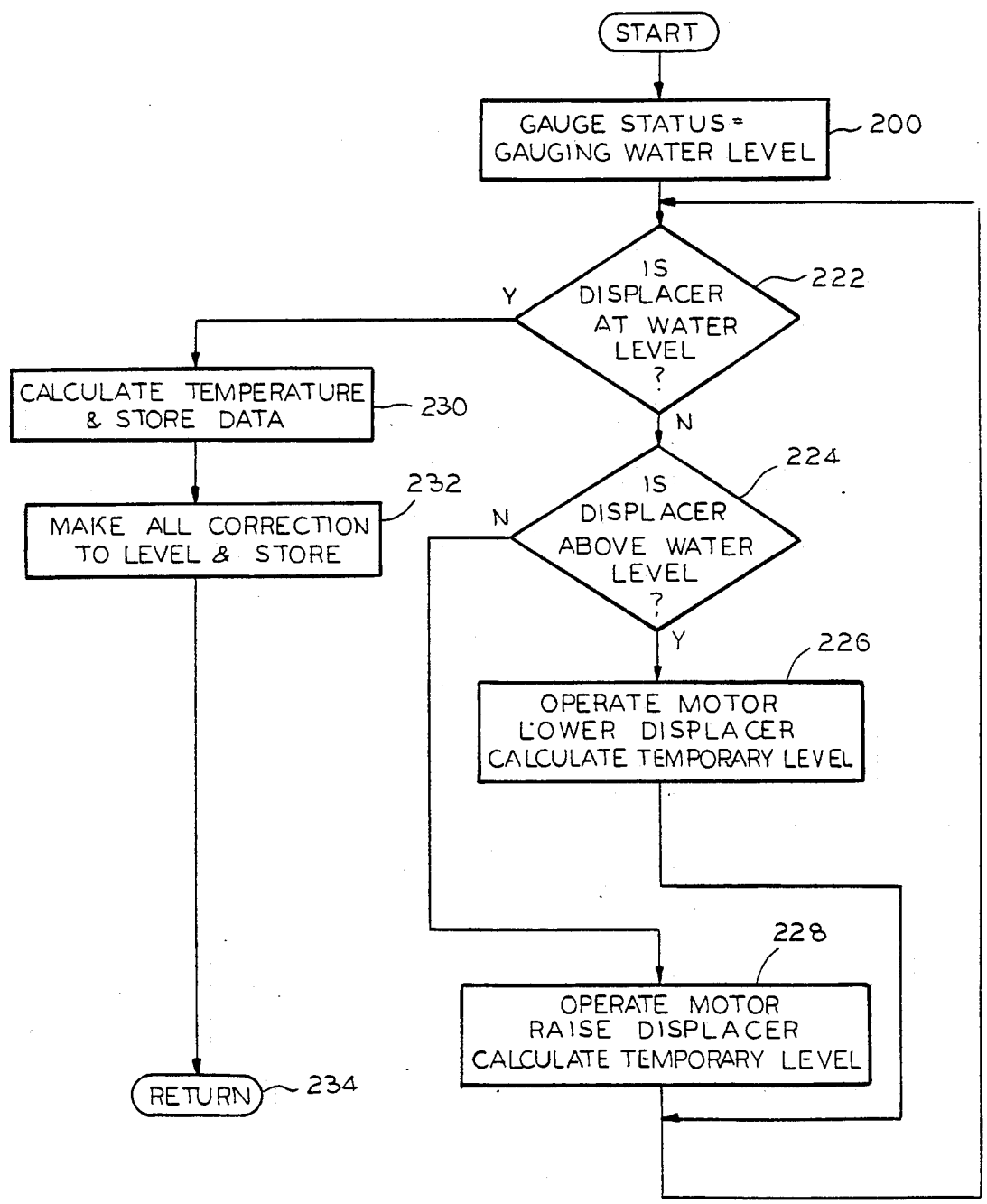

If a calculate water bottom command is received, then control advances to a block 218 which implements a water bottom routine represented by the flow chart of FIG. 10c. Control begins at a block 220 which sets a gauge status register to indicate that the control is gauging the level of water 22 in the tank 10. Actual control begins at a decision block 222 which determines if the displacer 26 is at the top surface of water, or water level. This determination is made dependent upon the position of the beam assembly 68, see FIG. 2. Specifically, as discussed above, the displacer is at water level when the encoder assembly 102 is positioned at position B.

If the displacer is not at water level, as determined at the decision block 222, then a decision block 224 determines if the displacer is above water level. Specifically, if the encoder assembly 102 is to the left of position B, then the displacer is above water level. If so, then at a block 226 the motor 84 is energized to lower the displacer 26. Also, based upon the movement, the system is operable to calculate a temporary level, representing the previous level less the amount represented by one step of motor movement. If the displacer is not above the water level, as determined at the decision block 224, then a block 228 is operable to energize the motor 84 to raise the displacer 26 and calculate a temporary level, as at block 226. From either block 226 or 228, control returns to the decision block 222 to see if the displacer is at water level.

Once the displacer is at water level, as determined at the decision block 222, then control advances to a block 230 which calculates the temperature as determined by the temperature sensor 184, see FIG. 9, and stores the data relative thereto. Thereafter, at a decision block 232, the system automatically corrects the temporary level data to provide a more accurate representation of level. Specifically, the tape 28 can become elongated with increases in temperature. Accordingly, the control compensates for any such elongation of the tape 28 using the temperature stored at the block 230. Also, since the tape 28 winds on itself on the spool 48, the number of turns wound on the spool increases the apparent radius of the storage spool and consequently changes the nominal length of tape per turn. Thus, the microprocessor compensates for changes in length in accordance with the following equation:

$$L = \pi[\Sigma Dmax - (n * tck)] + (n+1)Stc/Stpt$$

where:
L = length of tape 28 from top of spool 48 to displacer 26;
Dmax = max diameter of spool 48 when the displacer 26 is at the top;
n = number of turns made;
tck = thickness of tape 28;
Stc = number of steps counted since start of a given turn: and
Stpt = number of steps per turn.

Further, in the equilibrium state, the applied forces are balanced in accordance with the equation $$W_f + W_t = F_b + C_f$$

where:

- $W_f$ = the weight of the displacer 26;
- $W_t$ = the weight of the tape 28;
- $C_f$ represents the counterforce generated by the beam assembly 68; and
- $F_b$ represents the buoyancy force of the substance 12.

$W_f$ is a constant value for a given displacer 26. The weight of the tape $W_t$ varies with its length, which in turn varies with the liquid level. The counterforce $C_f$ is a constant.

In order to compensate for the weight of the tape, without requiring changes in the buoyancy force $F_b$, the system changes the ratio in moment arms, as discussed below. Specifically, a first moment arm comprises the counterforce $C_f$ multiplied by the length of the center of the beam assembly 68 from the shaft 52. A second moment arm comprises the length of the apparent radius of the spool 48, with the tape 28 wound thereon, multiplied by the remaining components of the above force equation. Resultantly, in the equilibrium condition, the following equation is satisfied:

$$C_f \cdot L_1 = [(W_t + W_f) - F_b] \cdot L_2$$

where $L_1$ is the length of the first moment arm and $L_2$ is the length of the second moment arm. Therefore:

$$C_f \cdot (L_1/L_2) = W_t + W_f - F_b$$

which represents the equilibrium of the torques resulting from the force applied in the system, from which it can be concluded that:

$$W_f + W_t + dW_t - F_b = C_f \cdot d(L_1/L_2)$$

where $W_f$, $F_b$, and $C_f$ are constant. Thus, the change of the tape mass $dW_t$ can be compensated for without affecting the buoyancy force $F_b$ by changing the ratio between the arms $L_1$ and $L_2$ in such a manner that the above equation remains true. This is done by selecting the diameter of the spool 48 relative to the weight of the tape 28 per unit length.

Thus, the block 232 is operable to make the above necessary corrections and store the resultant level value to be used as an accurate indication of level, or to control level, as necessary or desired. Thereafter, at a block 234, control returns to the main loop.

With reference again to FIG. 10a, control advances from the block 218 to the decision block 202.

If a calculate water bottom command has not been received, as determined at the decision block 216, then a decision block 236 determines if there is a specific gravity command. If so, then the system calculates specific gravity of the substance 12 at a block 238. The specific gravity is calculated by immersing the displacer 26 in the liquid 12 and sensing the difference in archemedy or buoyancy force, represented by the position in the coding strip 70, when the displacer is out of the liquid and when the displacer is immersed. Specifically, when the displacer 26 is out of the liquid, then the force applied to the level gauge is $W_{d1}$. When the displacer 26 is immersed, the applied force is $W_{d2}$ which is equal to $W_{d1} - F_b$, where $F_b$ is equal to the buoyancy force resulting from the displacer immersion. It is known that the buoyancy force is equal to the volume of the displacer multiplied by the specific gravity. The volume of the displacer is known. Therefore, the specific gravity is determined in accordance with the equation $$SG = (W_{d1} - W_{d2})/\text{volume of displacer 26.}$$

From the block 238, control returns to the decision block 202.

If there is no specific gravity command, as determined at the decision block 236, then a decision block 240 determines whether or not a calibrate command has been received. A calibrate command is used when it is necessary to automatically calibrate the servo gauge 24. Specifically, if a calibrate command has been received, then control advances to a block 241 which is operable to initiate the auto calibrate routine. The auto calibrate routine was discussed above relative to FIG. 10b, and is used to move the displacer 26 to the top of the tank 10. Thereafter, a seek oil command is issued at a block 242 which operates to return the control to normal operation which ultimately results in the motor driver circuit 192 operating the motor 84, see FIG. 9, until the displacer 26 is at the top surface of the oil, as sensed by the encoder assembly 102. Thus, the level is determined by counting the number of steps to move from the top wall 18 to the fluid level. Since the height of the tank 10 is known, then the actual level can be determined. Thereafter, control returns to the decision block 202.

If no calibrate command has been received, as determined at the decision block 240, then a decision block 244 determines whether a measure and calibrate command has been received. A measure and calibrate command is similar to a calibrate command. However, such a command is used when it is necessary to in essence calibrate the available height of the tank 10. For example, depending upon the volume of material in the tank 10, the side walls 14 may be bowed outward, causing the actual height of the tank 10 to decrease. Also, if sediment builds up on the bottom wall 16, then the available space in the tank 10 for storage decreases.

If a measure and calibrate is received, then control advances to a block 246 which performs the auto calibrate routine, discussed above, to move the displacer 26 to the top of the tank 10. Thereafter, at a block 247, the displacer 26 is lowered until it is at the tank bottom wall 16, or any other solid surface at the bottom. This is determined when the encoder assembly 102 senses the position labelled A, see FIG. 2. The number of steps of motor operation used to move the displacer 26 from the top wall 18 to the bottom wall 16 is measured and stored at a block 248 which thus recalculates the distance therebetween, representing the available height of the tank 10. Subsequently, an issue seek oil command is issued at a block 250 which returns control to normal operation, as above at block 242. Thus, the actual level of liquid in the tank is recalibrated, as well as the usable dimensions of the tank 10. Thereafter, control returns to the decision block 202.

If there is no measure and calibrate command, as determined at the decision block 244, then control advances to a decision block 252 which determines if a downloaded level command has been received. This command is used to download a level value to the gauge 24 if a particular tank does not permit automatic calibration to be performed. For example, if the bottom of the tank 10 is muddy, then the displacer could become stuck if the measure and calibrate routine is performed. If so, then the auto calibrate routine is initiated at a block 254 to raise the displacer 26 to the top of the tank 10. Thereafter, the displacer is lowered to the top surface of the substance 12, at a block 256. The measure and store calculation is performed at a block 258 to estimate the level based on movement from the top of the tank. Finally, an issue seek oil command is sent at a block 260 to return to normal operation. Thereafter, control return to the decision block 202.

Figure 10D:
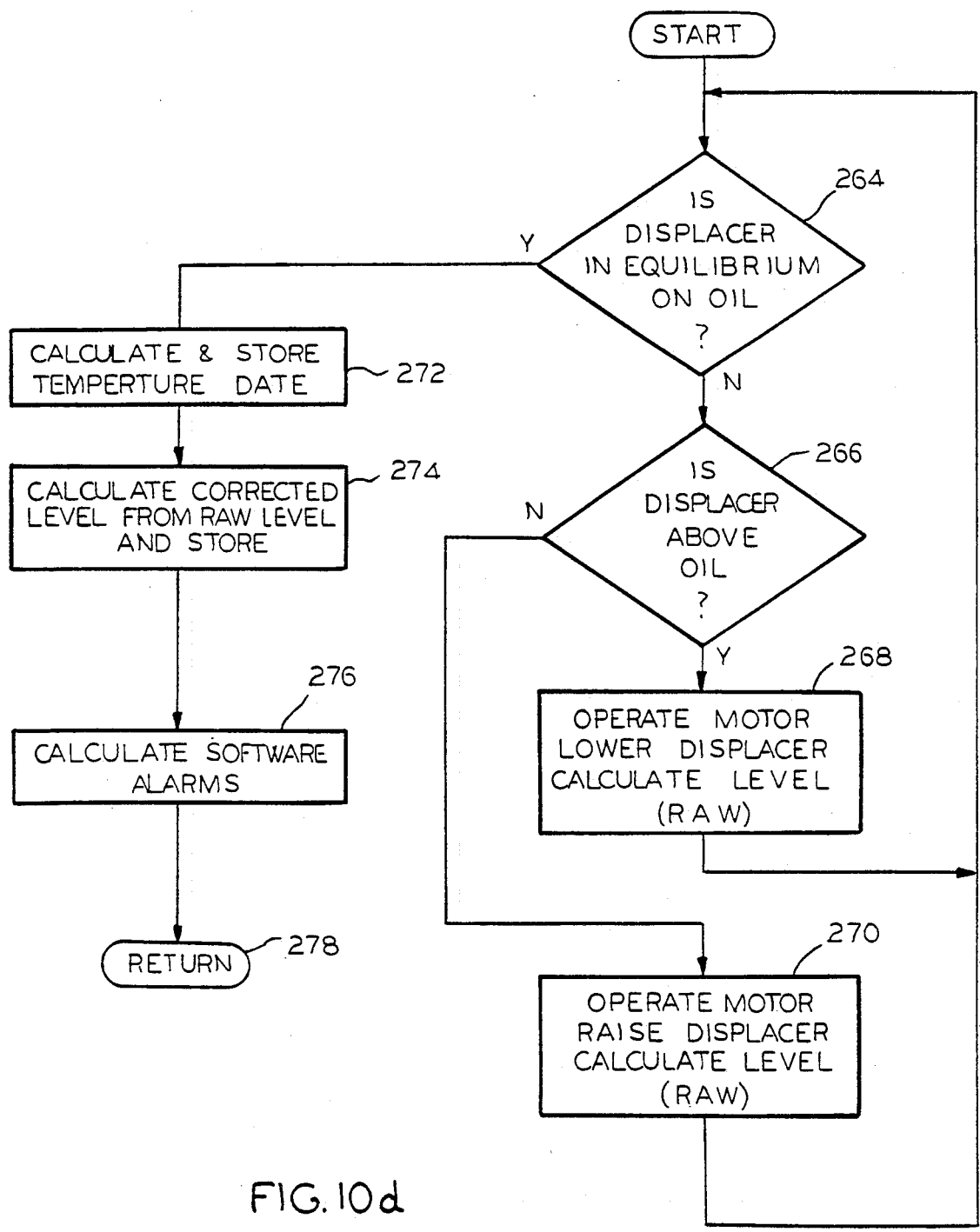

If a downloaded level command is not received, as determined at the decision block 252, then a calculate level routine is performed at a block 262. The calculate level routine is illustrated in FIG. 10d and is the general routine used for determining level of, for example, oil in the tank.

Level control begins at a decision block 264 which determines whether or not the displacer 26 is in an equilibrium position. Specifically, the control determines whether or not the encoder assembly 102 is sensing the select position on the coding strip 70 for the particular substance. If not, then a decision block 266 determines whether or not the displacer is above the top surface. If so, then at a block 268, the motor 84 is operated to lower the displacer 26. While this is being performed, the number of steps moved is used to calculate a rough approximation of movement of the displacer represented by the number of actuations of the motor 84. Thereafter, control returns to the decision block 264. If the displacer is not above the top surface of the oil, as determined at the decision block 266, then the displacer must be below the top surface of the oil. Therefore, at a block 270, the motor 84 is operated to raise the displacer 26 and also to calculate the rough distance, as discussed above relative to block 268. Thereafter, control returns to the decision block 264.

Once it is determined at the decision block 264 that the displacer 26 is at the top surface of the oil, represented by an equilibrium condition between the beam assembly 68 and the displacer 26, as determined by the select position relative to the coding strip 70, then control advances to a block 272 which calculates and stores the temperature received from the RTD sensor 184, see FIG. 9. Thereafter, at a block 274 the raw level is corrected for drum diameter compensation, wire mass compensation, and temperature compensation, as discussed above relative to block 232, see FIG. 10c. Thereafter, at a block 276, the control determines if any select alarm levels have been exceeded to provide an indication thereof. Finally, the level control routine ends at a block 278 and control returns to the main routine, see FIG. 10a, which is the end of the main loop. Therefore, control again advances to the decision block 202 to begin another cycle of operation.

Thus, in normal operation, the gauge head 30 provides an indication as to whether the beam assembly 68 is in equilibrium with the displacer 26. Specifically, by utilizing the coding strip 70, a plurality of different equilibrium levels can be utilized according to the type of substance being sensed. Moreover, it can be determined if the displacer 26 is at the bottom wall 16, suspended in air, or at the top wall 18, as discussed above. The tank side unit 34 senses whether or not the displacer 26 and beam assembly 68 are in an equilibrium condition and resultantly operate the motor 84, as necessary or desired, to control movement of the displacer 26. In determining changes in fluid level, the microprocessor is operable to compensate for the effective drum diameter, as well as for the mass of the extended portion of the tape wire 28. Finally, the microprocessor 168 can control operation of the gauge head 30 to automatically calibrate the servo gauge 24, as well as calibrating available volume in the tank itself. Finally, the servo gauge 24 can be utilized to provide an instantaneous measure of specific gravity of the fluid 12.

We claim:

1. A displacement servo gauge operable to sense level for any one of a plurality of different liquids comprising:
    a spool;
    a displacer;
    a tape wound on said spool and having an end connected to said displacer for suspending said displacer to impinge on a particular liquid surface;
    a counterweight assembly linked to said spool to balance said displacer when said displacer impinges on the particular liquid surface;
    a sensor operatively associated with said counterweight assembly for sensing a plurality of positions of said counterweight assembly, each position representing a balance condition for one of the plurality of different liquids;
    means for selecting one of said counterweight assembly positions according to the particular liquid;
    means for rotating said spool to move said displacer to the liquid surface incident to said sensor sensing an out of balance condition for the particular liquid; and
    means for determining change in level of the liquid surface as a function of rotational movement of said spool.

2. The displacement servo gauge of claim 1 wherein said spool is housed in a first enclosure and said counterweight assembly is housed in a second enclosure.

3. The displacement servo gauge of claim 1 wherein said spool is rotational with a shaft and said counterweight assembly is pivotally mounted to said shaft.

4. The displacement servo gauge of claim 1 wherein said rotating means comprises a motor secured to said counterweight assembly and a gear assembly connecting a motor shaft to a shaft carrying said spool.

5. The displacement servo gauge of claim 1 wherein said determining means comprises a processor operated in accordance with a program and operable to determine the level of the liquid surface.

6. The displacement servo gauge of claim 1 wherein said sensor comprises an encoder assembly.

7. The displacement servo gauge of claim 6 wherein said encoder comprises a coding strip having a plurality of spaced apart rows of apertures and a sensing device for sensing one of said rows.

8. The displacement servo gauge of claim 7 wherein said sensing device comprises a plurality of LED's supported adjacent a plurality of phototransistors.

9. The displacement servo gauge of claim 7 wherein said sensing device is movable relative to said coding strip.

10. The displacement servo gauge of claim 9 wherein said sensing device is fixedly mounted to said counterweight assembly.

11. A displacement servo gauge operable to sense specific gravity of a liquid comprising:
    a spool;
    a displacer;
    a tape wound on said spool and having an end connected to said displacer for suspending said displacer;

a counterweight assembly linked to said spool to balance said displacer relative to a liquid being sensed;

a sensor operatively associated with said counterweight assembly for sensing a plurality of positions of said counterweight assembly, each position representing a different balance condition of said counterweight assembly;

means for rotating said spool to move said displacer between positions out of the liquid and immersed in the liquid incident to said sensor sensing the select balance conditions related to such displacer positions; and means coupled to said rotating means and said sensor for determining specific gravity of the liquid being sensed.

12. The displacement servo gauge of claim 11 wherein said determining means comprises a processor operated in accordance with a program and operable to determine specific gravity of the liquid.

13. The displacement servo gauge of claim 11 wherein said determining means includes means for calculating specific gravity as a function of a difference between balance force when said displacer is immersed in the liquid and when said displacer is suspended above the liquid divided by volume of said displacer.

14. A displacement servo gauge comprising:
a spool;
a displacer;
a tape wound on said spool and having an end connected to said displacer for suspending said displacer;

a counterweight assembly linked to said spool to balance said displacer relative to a liquid in a closed tank being sensed;

means for sensing a plurality of select balance conditions of said counterweight assembly;

means for rotating said spool to move said displacer incident to said sensing means sensing an out of balance condition for a selected one of said balance conditions; and means coupled to said rotating means and said sensing means for determining level of the liquid being sensed as a function of rotational movement of said spool and including means for self-calibrating said determining means, wherein said self-calibrating means self-calibrates level in response to the sensed balance condition when said displacer is at a top of the tank and when said displacer is immersed in the liquid and when said displacer is at a bottom of the tank.

15. The displacement servo gauge of claim 14 wherein said determining means comprises a processor operated in accordance with a program and operable to determine level of the liquid and to control said rotating means to self-calibrate said determining means.

16. The displacement servo gauge of claim 14 wherein said self-calibrating means includes means for calculating level as a function of height of the tank determined by rotational movement required to move said displacer from the top of the tank to the bottom of the tank and the rotational movement required to move said displacer to a position where it impinges on a surface of the liquid.

* * * * *